(12) United States Patent
Park et al.

(10) Patent No.: US 9,110,775 B2
(45) Date of Patent: Aug. 18, 2015

(54) IN-VEHICLE INFOTAINMENT DEVICE AND DATA PROCESSING METHOD USING THE SAME

(71) Applicant: LG Electronics Inc., Seoul (KR)

(72) Inventors: Jongseon Park, Seoul (KR); Joonhyung Kim, Seoul (KR); Hyungjin Jeon, Seoul (KR); Chunsung Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 19 days.

(21) Appl. No.: 13/924,254

(22) Filed: Jun. 21, 2013

(65) Prior Publication Data

US 2013/0345898 A1    Dec. 26, 2013

Related U.S. Application Data

(60) Provisional application No. 61/662,928, filed on Jun. 22, 2012.

(51) Int. Cl.
*G06F 17/00* (2006.01)
*G06F 9/54* (2006.01)

(52) U.S. Cl.
CPC . *G06F 17/00* (2013.01); *G06F 9/54* (2013.01)

(58) Field of Classification Search
CPC ................................... G06F 17/00; G06F 9/54
USPC ................................................ 701/1; 719/313
See application file for complete search history.

(56) References Cited

U.S. PATENT DOCUMENTS

| | | | |
|---|---|---|---|
| 6,202,008 B1 * | 3/2001 | Beckert et al. ............... 701/29.1 |
| 6,505,100 B1 * | 1/2003 | Stuempfle et al. ................ 701/1 |
| 6,735,630 B1 * | 5/2004 | Gelvin et al. .................. 709/224 |
| 6,826,607 B1 * | 11/2004 | Gelvin et al. .................. 709/224 |
| 6,832,251 B1 * | 12/2004 | Gelvin et al. .................. 709/224 |
| 6,859,831 B1 * | 2/2005 | Gelvin et al. .................. 709/224 |
| 7,020,701 B1 * | 3/2006 | Gelvin et al. .................. 709/224 |
| 7,082,359 B2 * | 7/2006 | Breed ............................. 701/36 |
| 7,747,365 B1 * | 6/2010 | Lowrey et al. ............... 701/31.4 |
| 7,791,503 B2 * | 9/2010 | Breed et al. .................... 340/993 |
| 7,797,367 B1 * | 9/2010 | Gelvin et al. .................. 709/200 |
| 7,844,687 B1 * | 11/2010 | Gelvin et al. .................. 709/220 |
| 7,891,004 B1 * | 2/2011 | Gelvin et al. .................... 726/26 |
| 7,904,569 B1 * | 3/2011 | Gelvin et al. .................. 709/229 |
| 8,079,118 B2 * | 12/2011 | Gelvin et al. ..................... 26/26 |
| 8,140,658 B1 * | 3/2012 | Gelvin et al. .................. 709/224 |
| 8,400,296 B2 * | 3/2013 | Brinton et al. ............ 340/539.24 |
| 8,601,595 B2 * | 12/2013 | Gelvin et al. .................... 726/26 |
| 8,731,764 B2 * | 5/2014 | Bertosa et al. ............... 701/29.1 |
| 8,812,654 B2 * | 8/2014 | Gelvin et al. .................. 709/224 |
| 8,832,244 B2 * | 9/2014 | Gelvin et al. .................. 709/222 |
| 8,836,503 B2 * | 9/2014 | Gelvin et al. ............ 340/539.26 |
| 2010/0201516 A1 * | 8/2010 | Gelvin et al. ............ 340/539.26 |
| 2012/0079149 A1 * | 3/2012 | Gelvin et al. .................. 710/107 |

\* cited by examiner

*Primary Examiner* — Mary Cheung
*Assistant Examiner* — Frederick Brushaber
(74) *Attorney, Agent, or Firm* — Birch, Stewart, Kolasch & Birch, LLP

(57) ABSTRACT

An in-vehicle infotainment device includes a first processor for executing a web application, and a second processor for outputting vehicle data to the first processor. The first processor includes a first-processor-side inter-node communication (INC) interface module for transmitting and receiving information to and from the second processor, the second processor includes a second-processor-side INC interface module for transmitting and receiving information to and from the first processor, and the first processor provides the vehicle data received from the second processor to the web application if a request for vehicle data is received from the web application.

17 Claims, 4 Drawing Sheets

Fig. 4

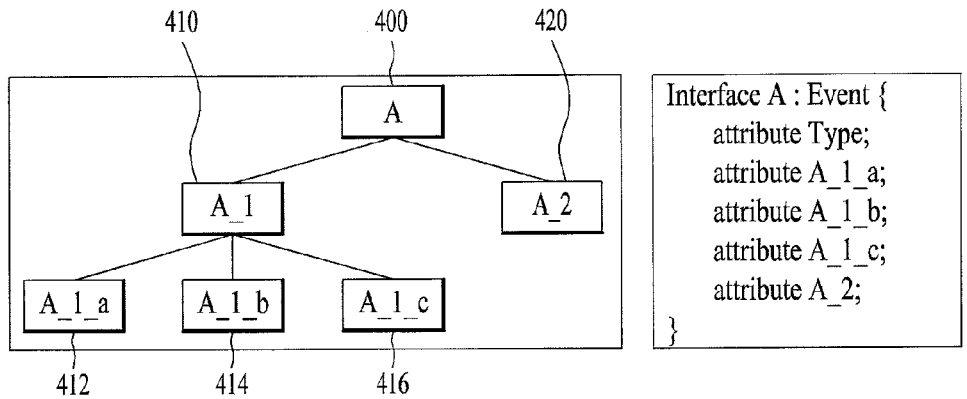

Interface A : Event {
    attribute Type;
    attribute A_1_a;
    attribute A_1_b;
    attribute A_1_c;
    attribute A_2;
}

Fig. 5

```
var TRANSMISSION_GEAR_TYPE_AUTO = 1;     } Define constants for transmissionGearType
var TRANSMISSION_GEAR_TYPE_MANUAL = 2;

vehicle.get("vehicle_info_transmission_gear_type", handleVehicleData(data), handleError(error))
function handleVehicleData(data) {
    if (data.transmissionGearType == TRANSMISSION_GEAR_TYPE_AUTO) {
        console.log("Automatic transmission equipped");
    } else if (data.transmissionGearType == TRANSMISSION_GEAR_TYPE_MANUAL) {
        console.log("Manual transmission equipped");
    }
}
```
} Get a transmission gear type from

Fig. 6

```
var TIRE_PRESSURE_STATUS_NORMAL = 0;
var TIRE_PRESSURE_STATUS_LOW = 1;        } Define constants for tirePressureStatus
var TIRE_PRESSURE_STATUS_HIGH = 2;

vehicle.get("maintenance_tire_pressure_status", handleVehicleData(data), handleError(error))
function handleVehicleData(data) {
    if ((data.tirePressureStatusFrontLeft != 0) || (data.tirePressureStatusFrontRight != 0) ||
        (data.tirePressureStatusRearLeft != 0) || (data.tirePressureStatusRearRight != 0)) {
        console.log("Check your tire pressure!");
    }
}
```
} Get tire pressure status information from MaintenanceEvent

Fig. 7

```
vehicle.addEventListener("driving_safety_door_open_status", handleVehicleData(data), false); } Monitor door open status from DrivingSafetyEvent function handleVehicleData(data) {
    if (data.type == "driving_safety_door_open_status_driver") {
        if (data.doorOpenStatusDriver) {
            console.log("The driver door is opened.");
        } else {
            console.log("The driver door is closed.");
        }
    } else if (data.type == "driving_safety_door_open_status_passenger") {
    }
}
```
⎬ This function is called when any of door open status is changed

Fig. 8

```
var DRIVING_MODE_COMFORT = 1;
var DRIVING_MODE_AUTO = 2;
var DRIVING_MODE_SPORT = 3;
var DRIVING_MODE_ECO = 4;
var DRIVING_MODE_MANUAL = 5;
```
⎬ Define constants for drivingMode

```
data = new Object();
data.drivingMode = DRIVING_MODE_SPORT;
vehicle.set("personalization_driving_mode", data, handleSuccess, handleError(error));
function handleSuccess() {
    console.log("Setting driving mode command is successfully sent to the vehicle bus.");
}
```
⎬ Monitor door open status from DrivingSafetyEvent

IN-VEHICLE INFOTAINMENT DEVICE AND DATA PROCESSING METHOD USING THE SAME

CROSS REFERENCE TO RELATED APPLICATIONS

Pursuant to 35 U.S.C. §119(e), this application claims the benefit of earlier filing date and right of priority to U.S. Provisional Application Ser. No. 61/662,928, filed on Jun. 22, 2012, the contents of which are hereby incorporated by reference in their entirety.

BACKGROUND OF THE INVENTION

1. Field of the Invention

The present invention relates to a data processing method using an in-vehicle infotainment device mounted in a vehicle and more particularly, to an in-vehicle infotainment device configured to efficiently process status information of a vehicle including an in-vehicle infotainment device and a data processing method using the same.

2. Discussion of the Related Art

An in-vehicle infotainment device provides a user with a vehicle information display function, a navigation function or a TV output function through an image display device mounted in a vehicle. Recently, with technological development, it is possible to execute a web application through an in-vehicle infotainment processor mounted in a vehicle.

Accordingly, a web application executed by an in-vehicle infotainment device mounted in a vehicle requires a data processing method of utilizing data corresponding to a vehicle status such as drive mode, speed or fuel quantity of the vehicle.

SUMMARY OF THE INVENTION

Accordingly, the present invention is directed to an in-vehicle infotainment device and a data processing method using the same that substantially obviate one or more problems due to limitations and disadvantages of the related art.

An object of the present invention is to provide an in-vehicle infotainment device configured to efficiently process status information of a vehicle including an in-vehicle infotainment device and a data processing method using the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an in-vehicle infotainment device includes a first processor for executing a web application, and a second processor for outputting vehicle data to the first processor. The first processor includes a first-processor-side inter-node communication (INC) interface module for transmitting and receiving information to and from the second processor, the second processor includes a second-processor-side INC interface module for transmitting and receiving information to and from the first processor, and the first processor provides the vehicle data received from the second processor to the web application if a request for vehicle data is received from the web application.

The first processor may display the web application on an external display device.

The first processor may control change of an execution screen of the displayed web application according to the provided vehicle data.

The first processor may receive a user action through an execution screen of the displayed web application and output a vehicle control command according to the user action.

If a vehicle control command is received from the web application, the first processor may output the vehicle control command to the second processor via the first-processor-side INC interface module.

The first processor may restrictively receive the user action according to the vehicle data received from the second processor.

The first processor may restrictively output the vehicle control command according to the vehicle data.

The first processor may provide the vehicle control command to the second processor such that the second processor performs a specific vehicle function.

The first processor may provide the web application with the vehicle data received from the second processor in an interface definition language (IDL) via a web vehicle plug-in.

The second processor may receive the vehicle data from a controller area network (CAN) controller.

The vehicle data transmitted and received via the INC interface module may be formatted in a CAN communication language.

The web application may be written in Java Script or HyperText Markup Language (HTML) code.

In another aspect of the present invention, a data processing method includes receiving a request for vehicle data from a web application, receiving the vehicle data from an external processor, providing the received vehicle data to the web application, receiving a vehicle control command from the web application, and outputting the received vehicle control command to the external processor such that the external processor controls a vehicle.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 is a diagram showing a data structure of vehicle data according to an embodiment of the present invention;

FIG. 5 is a diagram showing an example of a message for requesting vehicle data according to an embodiment of the present invention;

FIG. 6 is a diagram showing another example of a message for requesting vehicle data according to an embodiment of the present invention;

FIG. 7 is a diagram showing an example of a message for controlling a vehicle according to an embodiment of the present invention; and FIG. 8 is a diagram showing an example of an EventHandler for monitoring vehicle data according to an embodiment of the present invention.

DETAILED DESCRIPTION OF THE INVENTION

Hereinafter, a mobile terminal according to the present invention will be described in greater detail with reference to the drawings. The suffixes "module" and "unit" of the components used in the following description are used interchangeably for convenience of explanation and are not distinguished from each other in terms of meaning or role.

Figure 1:
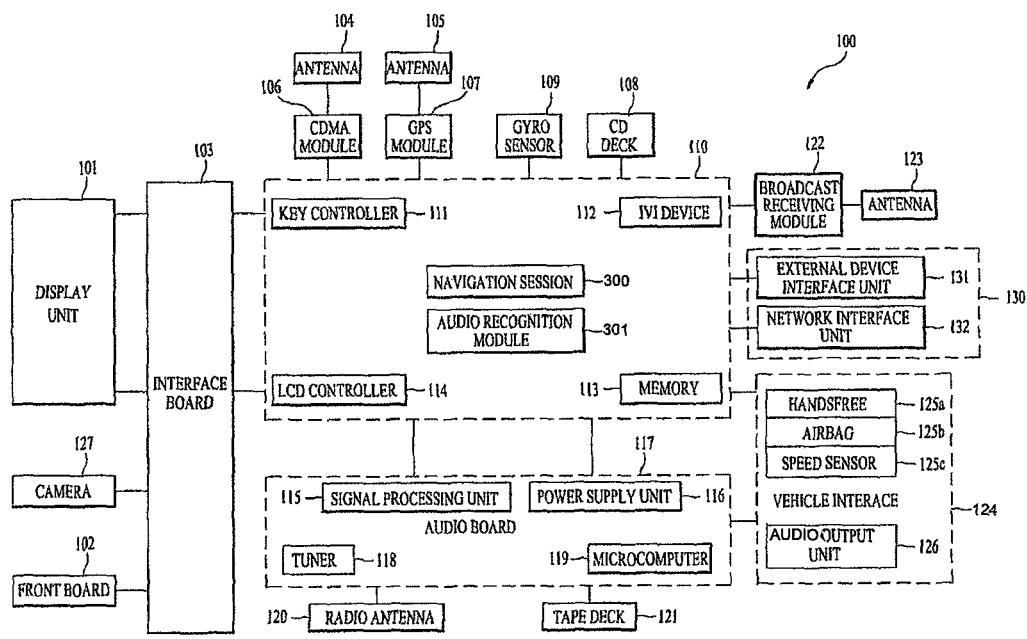
FIG. 1 is a schematic block diagram showing the configuration of an in-vehicle infotainment (IVI) system including an in-vehicle infotainment device according to an embodiment of the present invention.

FIG. 1 is a block diagram illustrating a configuration of an IVI system 100 according to the present invention.

As shown in FIG. 1, the IVI system 100 comprises a main board 110 including an in-vehicle infotainment device 112 configured to control an overall operation of the IVI system 100 (e.g., a central processing unit: CPU), a memory 113 configured to store therein programs for processing the in-vehicle infotainment device 112 and input/output data, a key controller 111 configured to control each kind of key signals, and an LCD controller 114 configured to control a liquid crystal display (LCD).

The memory 113 may store therein map information (map data) for displaying road guidance information on a digital map. Also, the memory 113 may store therein a traffic information collection control algorithm for inputting traffic information according to a road condition in which a vehicle is currently traveling, and information for controlling the algorithm.

To the main board 110, may be connected a CDMA (code division multiple access) module 106 provided with a unique device number and mounted in a vehicle, a GPS module 107 configured to receive a GPS signal for guiding a position of a vehicle and tracking a travel path from a starting point to a destination point or to transmit traffic information collected by a user in the form of a global positioning system (GPS) signal, a CD deck 108 configured to play a signal recorded in a compact disk (CD), a gyro sensor 109, etc. The CDMA module 106 and the GPS module 107 may transmit or receive signals through antennas 104 and 105.

A broadcast signal receiving module 122 may be connected to the main board 110, and may receive a broadcast signal through an antenna 123. To the main board 110, may be connected a display unit (LCD) 101 controlled by the LCD controller 114 through an interface board 103, a front board 102 controlled by the key controller 111, and a camera 127 configured to capture inside and/or outside of a vehicle. The display unit 101 is configured to display each kind of video signals and text signals. The front board 102 is provided with buttons for inputting each kind of key signals, and supplies a key signal corresponding to a button selected by a user to the main board 110. And, the display unit 101 includes the proximity sensor and the touch sensor (touch screen) of FIG. 2.

The front board 102 may be provided with a menu key for directly inputting traffic information, and the menu key may be configured to be controlled by the key controller 111.

The audio board 117 is connected to the main board 110, and processes each kind of audio signals. The audio board 117 includes a micro computer 119 configured to control the audio board 117, a tuner 118 configured to receive a radio signal, a power unit 116 configured to supply power to the micro computer 119, and a signal processor 115 configured to process each kind of audio signals.

The audio board 117 includes a radio antenna 120 configured to receive a radio signal, and a tape deck 121 configured to play an audio tape. The audio board 117 may further interface an audio output unit (e.g., amplifier) 126 configured to output an audio signal processed by the audio board 117.

The audio output unit (amplifier) 126 is connected to a vehicle interface 124. That is, the audio board 117 and the main board 110 are connected to the vehicle interface 124. To the vehicle interface 124, may be connected to a hands-free unit 125a for inputting an audio signal, an air bag 125b for a passenger's safety, a speed sensor 125c for detecting a vehicle speed, etc. The speed sensor 125c is configured to calculate a vehicle speed and to provide information on the calculated vehicle speed to the in-vehicle infotainment device 112.

The navigation session 300 applied to the IVI system 100 is configured to generate road guidance information based on map data and information on a current position of a vehicle, and to provide the generated road guidance information to a user.

The display unit 101 is configured to detect a proximity touch in a display window through a proximity sensor. For instance, when a pointer (e.g., a finger or a stylus pen) executes a proximity touch, the display unit 101 detects a position where the proximity touch has occurred and output position information corresponding to the detected position to the in-vehicle infotainment device 112.

An audio recognition device (or audio recognition module) 301 is configured to recognize an audio signal (voice) generated from a user, and to perform a corresponding function according to the recognized audio signal.

The navigation session 300 applied to the IVI system 100 displays a travel path on map data. When the mobile terminal 100 is within a preset distance from a blind spot included in the travel path, the navigation session 300 automatically forms a wireless network with a terminal mounted to a peripheral vehicle (e.g., vehicle navigation system) and/or a mobile terminal held by a passerby through a wireless communication network (e.g., short-range wireless communication network). This may allow the navigation session 300 to receive position information of the peripheral vehicle from the terminal mounted to the peripheral vehicle, and to receive position information of the passerby from the mobile terminal held by the passerby.

The main board 110 may be connected to the interface unit 130, and the interface unit 130 may include an external device interface unit 131 and a network interface unit 132.

The external device interface unit 131 may connect an external device to the IVI system 100. For this, the external device interface unit 131 may include an A/V input/output unit (not shown) or a wireless communication unit (not shown).

The external device interface unit 131 may be connected to an external device in a wired or wireless manner, the external device such as a DVD (Digital Versatile Disk), a Blu-ray, a game player, a camera, a camcorder and a notebook computer. The external device interface unit 131 transmits, to the in-vehicle infotainment device 112, a video signal or an audio signal or a data signal input from the outside through the connected external device. And, the video signal or the audio signal or the data signal processed by the in-vehicle infotainment device 112 may be output to the connected external device.

The A/V input/output unit may include a USB terminal, a CVBS (Composite Video Banking Sync) terminal, a component terminal, an S-video terminal (analogue), a DVI (Digital Visual Interface) terminal, an HDMI (High Definition Multimedia Interface) terminal, an RGB terminal and a D-SUB terminal, so that an audio signal and a video signal of an external device are input to the IVI system 100.

The wireless communication unit may perform a short-range wireless communication with other electronic device. For instance, the IVI system 100 may be connected to other electronic device through a network, according to a communication standard such as Bluetooth, RFID (Radio Frequency Identification), IrDA (infrared Data Association), UWB (Ultra Wideband), ZigBee and DLNA (Digital Living Network Alliance).

The external device interface unit 131 may be connected to various set-top boxes through one of the aforementioned terminals, thereby performing inputs and outputs with the set-top boxes.

The external device interface unit 131 may receive applications inside a neighboring external device or a list of applications, and transmit the received applications or list to the in-vehicle infotainment device 112 or the memory 113.

The network interface unit 130 provides an interface for connecting the image display apparatus 100 to a wired/wireless network including an internet network. The network interface unit 130 may be provided with an Ethernet terminal for connection with a wired network, and may utilize communication standards such as WLAN (Wireless LAN)(Wi-Fi), Wibro (Wireless broadband), Wimax (World Interoperability for Microwave Access), and HSDPA (High Speed Downlink Packet Access) for connection with a wireless network.

The network interface unit 132 provides an interface for connecting the IVI system 100 to a wired or wireless network including an internet network. The network interface unit 132 may be provided with an Ethernet terminal for accessing a wired network, and may utilize a communication standard such as WLAN (Wireless LAN)(Wi-Fi), Wibro (Wireless broadband), Wimax (World Interoperability for Microwave Access) and HSDPA (High Speed Downlink Packet Access) for accessing a wireless network.

The network interface unit 132 may transmit or receive data to/from other user or other electronic device, through an accessed network or other network linked to an accessed network. Especially, the network interface unit 132 may transmit some of contents data stored in the IVI system 100, to a user or an electronic device selected from a plurality of users or electronic devices pre-registered in the IVI system 100.

The network interface unit 132 may access a predetermined web page through an accessed network or other network linked to an accessed network. More concretely, the network interface unit 132 may access a predetermined web page through a network thus to perform data transmission or data reception with a corresponding server. Also, the network interface unit 132 may receive contents or data provided from a contents provider or a network operator. More concretely, the network interface unit 132 may receive contents of a film, an advertisement, a game, a VOD, a broadcasting signal, etc. provided from a contents provider or a network provider through a network, and information relating to the contents. The network interface unit 132 may receive update information and an update file of a firmware provided from a network operator. The network interface unit 132 may transmit data to an internet or contents provider or a network operator.

And, the network interface unit 132 may receive, through a network, a desired application by selecting from applications open to the public.

Hereinafter, the in-vehicle infotainment device 112 included in the IVI system and a vehicle data processing method using the same will be described.

Figure 2:
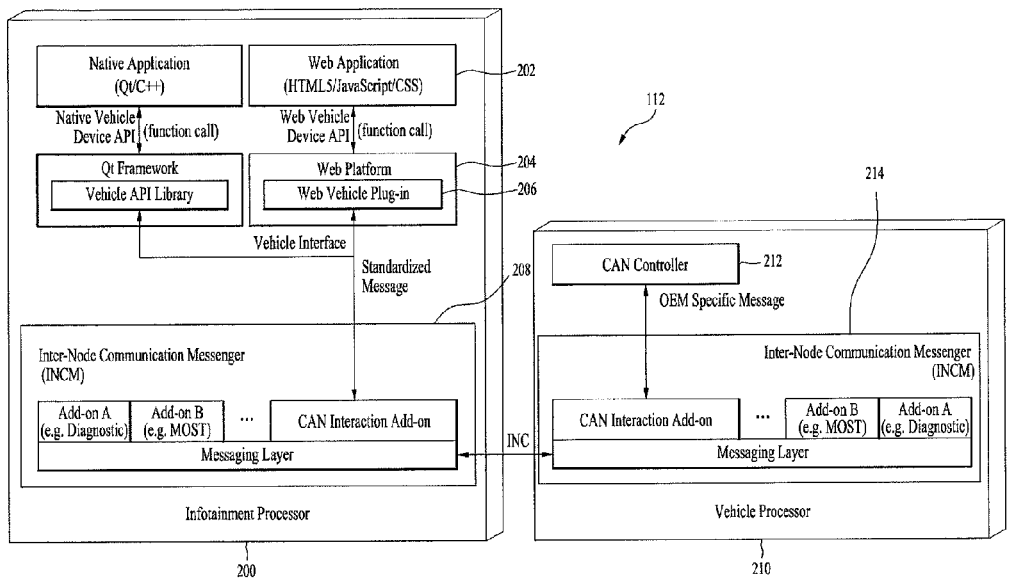
FIG. 2 is a schematic diagram of an in-vehicle infotainment device according to an embodiment of the present invention.

FIG. 2 is a schematic diagram of an in-vehicle infotainment device 112 according to an embodiment of the present invention.

First, the in-vehicle infotainment device 112 includes a first processor 200 for executing a web application 202 and a second processor 210 for outputting vehicle data to the first processor 200.

The first processor 200 may include a first-processor-side inter-node communication (INC) interface module 208 for transmitting and receiving information to and from the second processor 210 and a second-processor-side INC interface module 214 for transmitting and receiving information to and from the first processor.

The first processor 200 and the second processor 210 may be connected via respective INC interface modules 208 and 214. INC is a communication protocol between a vehicle processor and an infotainment processor.

The second processor 210 may receive data related to the status of each part of a vehicle or data sensed by a sensor included in the vehicle from a CAN controller 212. For example, the second processor 210 may receive information about whether or not a vehicle is being driven from the CAN controller 212.

At this time, the second processor 210 may receive vehicle data as a message based on the CAN communication standard.

The second processor 210 may output the vehicle data received from the CAN controller 212 to the first processor 200 via the INC module 214. At this time, the INC module 214 may include vehicle data in a CAN interaction region of an INC message and output the vehicle data to the first processor 200.

Then, the first processor 200 may receive an INC message including the vehicle data from the second processor 210 via the INC module 208.

The first processor 200 may provide the web application 202 with the vehicle data included in the INC message via the web application platform 204.

The web application platform 204 is used to execute the web application 202, which will be described below with reference to FIG. 3.

The web application 202 may be written in Java Script or HyperText Markup Language (HTML) code.

In addition, the execution screen of the web application 202 may be displayed on a display unit 101 mounted in the vehicle. Then, the first processor 200 may receive a user action via the displayed execution screen of the web application 202.

For example, the first processor 200 may receive a user action through buttons for inputting each kind of key signals of the front board 102. As another example, if the display unit 101 is a touchscreen, a user action for selecting an object displayed on the execution screen of the web application 202 may be received.

Then, the first processor 200 may output a vehicle control command to the second processor 210 according to the received user action. At this time, the first processor 200 may output the INC message including the vehicle control command in the CAN interaction region to the second processor 210 through the INC module.

Next, the second processor 210 may output the vehicle control command included in the INC message to the CAN controller 212 to control parts of the vehicle.

Hereinafter, a web application platform 204 used when the first processor 200 executes the web application 202 will be described.

Figure 3:
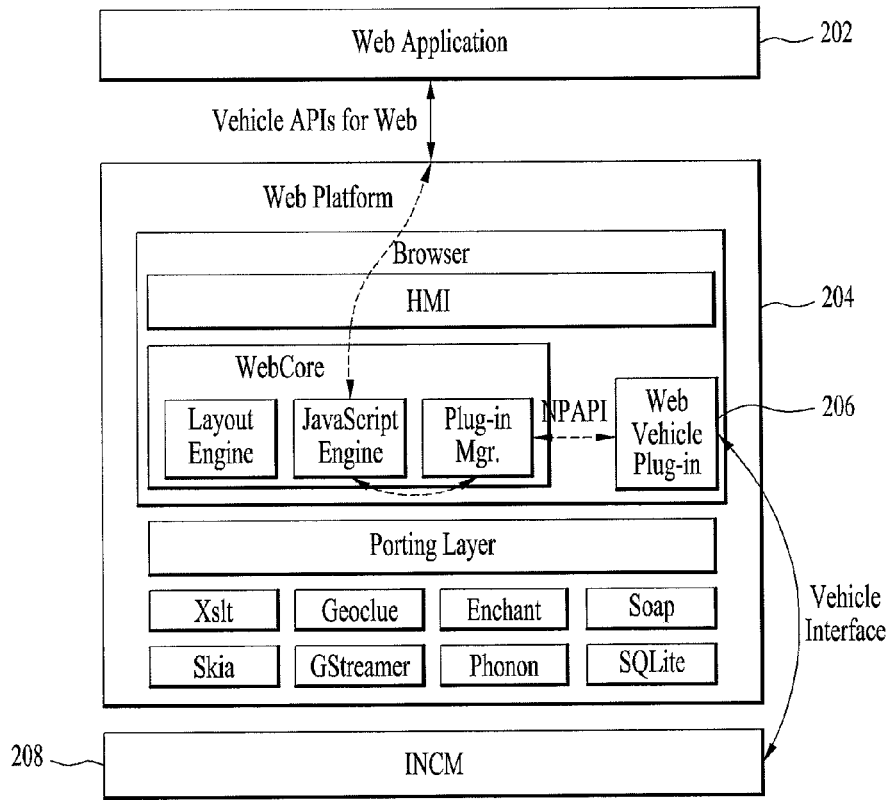
FIG. 3 is a schematic diagram of a web application platform according to an embodiment of the present invention.

FIG. 3 is a schematic diagram of a web application platform 204 according to an embodiment of the present invention. The web application platform 204 includes a web vehicle plug-in 206. The web vehicle plug-in 206 may provide the web application 202 with a web application programming interface (API) for vehicle data and control command processing.

The web API may be defined as an interface for the web application 202 in the in-vehicle infotainment system 100 for accessing vehicle data received via a vehicle data bus. At this time, the web API for vehicle data may be defined in a web interface definition language (IDL).

The web API may restructure and provide the vehicle data received from the second processor 210 to the web application 202 in the web IDL via the web vehicle plug-in 206.

In addition, the web API may output a GET command of the web application for requesting vehicle data or a SET command of the web application 202 for controlling a vehicle to the INC module via the web vehicle plug-in.

By the GET command, if the vehicle data is received from the second processor 210, the web application platform 204 may change each value included in the vehicle data to a web IDL.

By the SET command, if a vehicle control command is output from the web application, the web application platform 204 may change the vehicle control command to CAN communication language.

The vehicle control command changed to CAN communication language by the web application platform 204 may be output to the second processor 210 via the INC module 208.

All interfaces for data exchange may pass to a VehicleEvent interface and may be defined. All vehicle data may be one kind of VehicleEvent and may be accessed as attributes of VehicleEvent.

At this time, the GET command the SET command may be Java Script objects. This will be described below with reference to FIGS. 5 to 7.

Next, a data structure of vehicle data will be described with reference to FIG. 4.

FIG. 4 is a diagram showing a data structure of vehicle data according to an embodiment of the present invention. As shown, the data structure of the vehicle data may be a data tree structure composed of a higher node 400 and lower nodes 410 and 420 commonly including attributes of the higher node.

At this time, an internal value of vehicle data changed to the IDL may be located at distal nodes 412, 414, 416 and 420. The higher node 410 having at least one lower node 412, 414 and 416 may be defined as an ID indicating a data group having an internal value of common attributes.

In addition, the vehicle data may be located as the internal value of the lower nodes 412, 414 and 416 of any one higher node 410 according to the common attributes of the vehicle data.

All nodes may be defined by a variable Type_ID. The type attributes may be used as an ID for identifying a vehicle data type and a data validity range. For example, with respect to the shown data structure, only an A__1_b node 414 is valid if the attribute type is "A__1_b", only an A__1_a node 412, an A__1_b node 414 and an A__1_c node 414 are valid if the attribute type is "A__1", and an A__1_a node 412, an A__1_b node 414, an A__1_c node 414 and an A__2 node 420 are valid if the attribute type is "A".

Hereinafter, a message for requesting vehicle data and outputting a vehicle control command will be described with reference to FIGS. 5 to 7.

FIG. 5 is a diagram showing an example of a message for requesting vehicle data according to an embodiment of the present invention. In FIG. 5, assume that the requested vehicle data is related to a vehicle transmission gear type.

If only data about a vehicle transmission gear type is requested using the GET command, the vehicle data may be delivered to the web application 202 via a unified object including a vehicle data set. However, only data about a vehicle transmission gear type requested using the GET command in the vehicle data set is valid.

As shown, a vehicle transmission gear type variable may be defined. An automatic transmission gear type variable may be defined as TRANSMISSION_GEAR_TYPE_AUTO=1 and a manual transmission gear type variable may be defined as TRANSMISSION_GEAR_TYPE_MANUAL=2.

The web application 202 may request "vehicle_info_transmission_gear_type" from the web vehicle plug-in 206 via the GET command and perform a function according to the vehicle transmission gear type data received by the request.

For example, if the vehicle transmission type data is TRANSMISSION_GEAR_TYPE_AUTO, the web application 202 may output a phase "Automatic transmission equipped" on the display unit 101 as a console.log function. As another example, if the vehicle transmission type data is TRANSMISSION_GEAR_TYPE_MANUAL, the web application 202 may output a phase "Manual transmission equipped" on the display unit 101 as a console.log function.

FIG. 6 is a diagram showing another example of a message for requesting vehicle data according to an embodiment of the present invention. In FIG. 6, assume that vehicle data is related to pressure of a vehicle tire.

If only data about a vehicle tire pressure status is requested using the GET command, the vehicle data may be delivered to the web application 202 as a unified object including a vehicle data set. However, only data about a vehicle tire pressure status requested using the GET command in the vehicle data set is valid.

As shown, a variable according to data about vehicle tire pressure status may be defined. A normal vehicle tire pressure status may be defined as TIRE_PRESSURE_STATUS_NORMAL=1, a low vehicle tire pressure status may be defined as TIRE_PRESSURE_STATUS_LOW=2 and a high vehicle tire pressure status may be defined as TIRE_PRESSURE_STATUS_HIGH=3.

The web application 202 may request "maintenance_tire_pressure_status" from the web vehicle plug-in 206 via the GET command and perform a function according to data about the vehicle tire pressure status by the request.

For example, if data about all vehicle tire pressure statuses is not 0, the web application 202 may output a message "Check your tire pressure" on the display unit 101 as a console.log function.

"maintenance_tire_pressure_status" may be used as an upper level VehicleEventType of "_FRONT_LEFT", "_FRONT_RIGHT", "_REAR_LEFT" and "_REAR_RIGHT". Vehicle data requested and received by "maintenance_tire_pressure_status" may include data of "_FRONT_LEFT", "_FRONT_RIGHT", "_REAR_LEFT" and "_REAR_RIGHT".

That is, if upper level data is requested by the web application 202, all data values of a level lower than the requested upper level may be output.

Next, FIG. 7 is a diagram showing an example of a message for controlling a vehicle according to an embodiment of the present invention. As the value of each part of a vehicle is set via the SET command, the function of the vehicle may be controlled. In FIG. 7, assume that a value of a vehicle driving mode is set.

First, a driving mode variable may be defined as DRIVING_MODE_COMFORT=1, DRIVING_MODE_AUTO=2, DRIVING_MODE_SPORT=3, DRIVING_MODE_ECO=4 and DRIVING_MODE_MANUAL=5.

If the driving mode value is set to DRIVING_MODE_SPORT, the first processor 200 may output a message for changing the driving mode according to the set value to the second processor 210 via the INC module and the web application 202 may output a message "Setting driving mode command has been successfully sent to the vehicle bus" on the display unit 101 as a console.log function.

At this time, the first processor 200 may restrict vehicle function setting via the vehicle data received from the second processor 210.

For example, if the vehicle is being driven, the first processor 200 may determine that the vehicle is in a driving mode via the vehicle data received from the second processor 210. Then, even when a SET command for opening a vehicle door is output from the web application 202, the first processor 200 may not output a message for opening the vehicle door to the second processor 210.

Alternatively, if the vehicle is being driven, the first processor 200 may halt execution of the web application 202 for controlling the vehicle door.

Alternatively, if the vehicle is being driven, the first processor 200 may stop the display of the display unit 101 of the web application 202 for controlling the vehicle door.

That is, the first processor 200 may halt execution of web application 202 according to the vehicle status determined as the vehicle data. In addition, the first processor 200 may stop the display of the web application 202 according to the vehicle status determined as the vehicle data. In addition, the first processor 200 may not output the SET command output from the web application 202 to the second processor 210 according to the vehicle status determined as the vehicle data.

In addition, the first processor 200 may restrict the range for setting the vehicle by the web application 202 according to the vehicle status determined as the vehicle data.

For example, when the vehicle is being driven, if a SET command for changing the height of a driver's seat by a predetermined range or more is output, the first processor 200 may not output the SET command to the second processor 210. At this time, the first processor 200 may output a message "The height of the seat cannot be changed by the predetermined range or more" on the display unit 101.

Alternatively, the first processor 200 may change the execution screen of the web application 202 displayed in order to change the height of the driver's seat if the vehicle is being driven. For example, the first processor may control the web application 202, which is displayed in order to change the height of the driver's seat, to display only a height range of the driver's seat changeable by the user.

FIG. 8 is a diagram showing an example of an EventHandler for monitoring vehicle data according to an embodiment of the present invention. EventHandler may be used to monitor variation in specific vehicle event data. EventHandler may use an upper level event type in order to monitor variation in vehicle event data of a vehicle event data group.

The EventHandler may be called whenever vehicle event data of the group is changed.

As shown, an event handler "addEventListener" for monitoring variation in "driving_safety_door_open_status" which is vehicle event data indicating the open/close status of the vehicle door is set.

This means an event handler for executing a handleVehicleData function if the current open/close status of the vehicle door is changed.

The handleVehicleData function outputs a message indicating the open/closed status of the vehicle door on the display unit 101 according to the value of "driving_safety_door_open_status".

The in-vehicle infotainment device according to the present invention has the following effects.

According to at least one of the embodiments of the present invention, it is possible to easily execute a web application in the in-vehicle infotainment device.

According to at least one of the embodiments of the present invention, it is possible to efficiently process vehicle status information in a web application.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An in-vehicle infotainment device configured to be installed in a vehicle and comprising:
    a first processor configured to execute a web application; and
    a second processor configured to output vehicle data to the first processor, the second processor including a controller area network (CAN) controller for generating a first CAN message including the vehicle data,
    wherein the first processor includes a first-processor-side inter-node communication (INC) interface module configured to communicate with the second processor,
    wherein the second processor includes a second-processor-side INC interface module configured to communicate with the first processor,
    wherein the first processor is configured to:
    provide the vehicle data output from the second processor to the web application in response to a request for vehicle data that is received by the first processor from the web application,
    display the web application on a display unit of the in-vehicle infotainment device,
    receive the vehicle data output from the second processor via the first-processor-side ICN interface module,
    receive, via the web application, a vehicle control command,
    convert the vehicle control command to a second CAN message, and
    output the second CAN message to the second processor such that the second processor performs a specific vehicle function,
    wherein the second processor is configured to output the second CAN message to the CAN controller.

2. The in-vehicle infotainment device according to claim 1, wherein the first processor is configured to control a change of an execution screen of the displayed web application according to the vehicle data output from the second processor.

3. The in-vehicle infotainment device according to claim 1, wherein the first processor is configured to receive a user action through an execution screen of the displayed web application and output a vehicle control command according to the user action.

4. The in-vehicle infotainment device according to claim 3, wherein the first processor is configured to restrictively receive the user action according to the vehicle data output from the second processor.

5. The in-vehicle infotainment device according to claim 3, wherein, the first processor is configured to restrictively output the vehicle control command according to a specific vehicle status.

6. The in-vehicle infotainment device according to claim 1, wherein, in response to a vehicle control command received from the web application, the first processor is configured to output the vehicle control command to the second processor via the first-processor-side INC interface module.

7. The in-vehicle infotainment device according to claim 1, wherein the first processor is configured to provide the web application with the vehicle data output from the second processor in an interface definition language (IDL) via a web vehicle plug-in.

8. The in-vehicle infotainment device according to claim 1, wherein the vehicle data is formatted in a controller area network (CAN) communication language.

9. The in-vehicle infotainment device according to claim 1, wherein the web application is written in Java Script or HyperText Markup Language (HTML) code.

10. A data processing method performed by an in-vehicle infotainment device, the method comprising:
    generating, by a controller area network (CAN) controller of a second processor, a first CAN message, the first CAN message including vehicle data;
    receiving, by a first processor, the vehicle data from the second processor, wherein data transmission and reception between the first and second processor is performed according to an inter-node communication protocol;
    receiving, by the in-vehicle infotainment device installed in a vehicle, a request for vehicle data from a web application;
    displaying an execution screen of the web application on a display unit of the in-vehicle infotainment device;
    receiving, by the first processor, the vehicle data from the second processor;
    providing, by the first processor, the received vehicle data to the web application;
    receiving, by the in-vehicle infotainment device, a vehicle control command from the web application;
    converting, by the first processor, the vehicle control command to a second CAN message; and
    outputting, by the first processor, the second CAN message to the second processor such that the second processor controls the vehicle.

11. The data processing method according to claim 10, further comprising:
    changing the execution screen of the displayed web application according to the received vehicle data.

12. The data processing method according to claim 10, wherein the vehicle control command includes a user action received via the web application.

13. The data processing method according to claim 12, further comprising:
    determining whether a current vehicle status is a specific status based on the received vehicle data; and
    changing and displaying an execution screen of the web application for receiving a user action to correspond to the specific status when the current vehicle status is the specific status.

14. The data processing method according to claim 13, wherein the vehicle control command is restrictively output when the vehicle status is the specific status.

15. The data processing method according to claim 13, wherein the user action is restrictively received according to the received vehicle data.

16. The data processing method according to claim 10, wherein the vehicle data is provided to the web application in an interface definition language (IDL) via a web vehicle plug-in.

17. The data processing method according to claim 10, wherein the web, application is written in Java Script or HyperText Markup Language (HTML) code.

* * * * *